(12) United States Patent
Shiau et al.

(10) Patent No.: US 12,242,738 B2
(45) Date of Patent: Mar. 4, 2025

(54) CARD READER AND CONTROLLER, AND METHOD FOR PERMISSION MANAGEMENT

(71) Applicant: Realtek Semiconductor Corp., HsinChu (TW)

(72) Inventors: Jiunn-Hung Shiau, HsinChu (TW); Neng-Hsien Lin, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 63 days.

(21) Appl. No.: 18/140,578

(22) Filed: Apr. 27, 2023

(65) Prior Publication Data
US 2023/0367490 A1    Nov. 16, 2023

(30) Foreign Application Priority Data

May 10, 2022 (TW) .................................. 111117478

(51) Int. Cl.
    *G06F 3/06* (2006.01)
(52) U.S. Cl.
    CPC .......... *G06F 3/0622* (2013.01); *G06F 3/0653* (2013.01); *G06F 3/0679* (2013.01)
(58) Field of Classification Search
    CPC ........ G06F 21/79; G06F 21/78; G06F 21/805; G06F 21/80; G06F 3/0622; G06F 3/0653; G06F 3/0679; G06F 3/0632; G06F 3/0644; G06Q 20/35765; G06Q 20/3576
    See application file for complete search history.

(56) References Cited

U.S. PATENT DOCUMENTS

| 10,489,335 | B1 * | 11/2019 | Chen ................. G06K 19/07741 |
| 2008/0155681 | A1 * | 6/2008 | Mukouchi ............... G06F 21/35 726/17 |
| 2009/0122989 | A1 * | 5/2009 | Asnaashari ........... H04L 9/3226 380/278 |
| 2016/0216733 | A1 * | 7/2016 | Wang ..................... G06F 1/1654 |
| 2018/0191732 | A1 * | 7/2018 | Erciyes ................. H04L 63/107 |
| 2019/0034668 | A1 * | 1/2019 | Novoa ................... G06F 1/1632 |
| 2020/0387460 | A1 * | 12/2020 | Lin ...................... G06F 13/4282 |
| 2022/0066637 | A1 * | 3/2022 | Evano ..................... G06F 3/062 |

FOREIGN PATENT DOCUMENTS

| JP | 2005266952 | A | * | 9/2005 |
| TW | 484096 | B | | 4/2002 |
| TW | 200744096 | | | 12/2007 |
| TW | 201137618 | A | * | 11/2011 |
| TW | 201137618 | A1 | | 11/2011 |

* cited by examiner

*Primary Examiner* — Curtis James Kortman
(74) *Attorney, Agent, or Firm* — Winston Hsu (57) ABSTRACT

A card reader and a controller thereof, and a method are provided. The card reader includes a storage device and the controller, wherein the controller is coupled to the storage device. The storage device is configured to store specific identification data of a specific memory device. The controller is configured to receive identification data of the external memory device plugged into the card reader, and determine whether the external memory device is the specific memory device according to the identification data and the specific identification data, to generate a determination result. More particularly, the controller may control whether to open permission of at least one function according to the determination result.

14 Claims, 8 Drawing Sheets

CARD READER AND CONTROLLER, AND METHOD FOR PERMISSION MANAGEMENT

BACKGROUND OF THE INVENTION

1. Field of the Invention

The present invention is related to card readers, and more particularly, to a card reader, a controller of the card reader, and a method for permission management.

2. Description of the Prior Art

With the beginning of the digitalized generation, digital data is gradually replacing physical data such as paper. To prevent people's private data from being obtained, many manufacturers have proposed Universal Serial Bus (USB) flash drives equipped with security mechanisms for protecting the data stored therein. For example, a USB flash drive may have a numeric keypad configured thereon for keyword input, or have a recognition module capable of sensing fingerprints. The disadvantage of the above methods is that they notify that there is private data stored in the apparatus. Furthermore, in comparison with typical USB flash drives, such apparatus needs an additional keypad module or fingerprint recognition module installed thereon, which increases the product size, therefore also increasing the manufacturing costs, which makes it less attractive for both manufacturers and buyers.

Thus, there is a need for a novel method and associated architecture which can provide associated security mechanism to protect private data stored therein without introducing any side effect or in a way that is less likely to introduce side effects.

SUMMARY OF THE INVENTION

An objective of the present invention is to provide a card reader, a controller thereof and a method for permission management, in order to provide an information security mechanism of a memory device that can maintain the functions and outward appearance of a typical card reader.

At least one embodiment of the present invention provides a card reader. The card reader comprises a storage device and a controller, wherein the controller is coupled to the storage device. The storage device is configured to store specific identification data of a specific memory device. The controller is configured to receive identification data of an external memory device plugged into the card reader, and determine whether the external memory device is the specific memory device according to the identification data and the specific identification data, to generate a determination result. More particularly, the controller may control whether to open permission of at least one function according to the determination result.

At least one embodiment of the present invention provides a controller of a card reader. The controller comprises a processing circuit, and the processing circuit is coupled to a storage device. The processing circuit is configured to control operations of the controller according to data stored in the storage device, wherein the storage device is configured to store specific identification data of a specific memory device. For example, the controller may receive identification data of an external memory device plugged into the card reader, and determine whether the external memory device is the specific memory device according to the identification data and the specific identification data, to generate a determination result. More particularly, the controller may control whether to open permission of at least one function according to the determination result.

At least one embodiment of the present invention provides a method for permission management, wherein the method is applicable to a controller of a card reader. The method comprises: utilizing the controller to receive identification data of an external memory device plugged into the card reader; utilizing the controller to determine whether the external memory device is a specific memory device according to the identification data and specific identification data of the specific memory device, to generate a determination result; and utilizing the controller to control whether to open permission of at least one function according to the determination result.

The card reader, the controller thereof and the method provided by the embodiments of the present invention can take the specific memory device as a key. When a certain user intends to access an embedded memory which is protected, it is required to plug the specific memory device into a socket of the card reader in order to obtain access permission to the embedded memory. As these sockets are an existing mechanical structure common to many electronic devices, they are unlikely to draw undue attention. Furthermore, the embodiments of the present invention will not greatly increase additional costs. Thus, the present invention can solve the problem of the related art without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
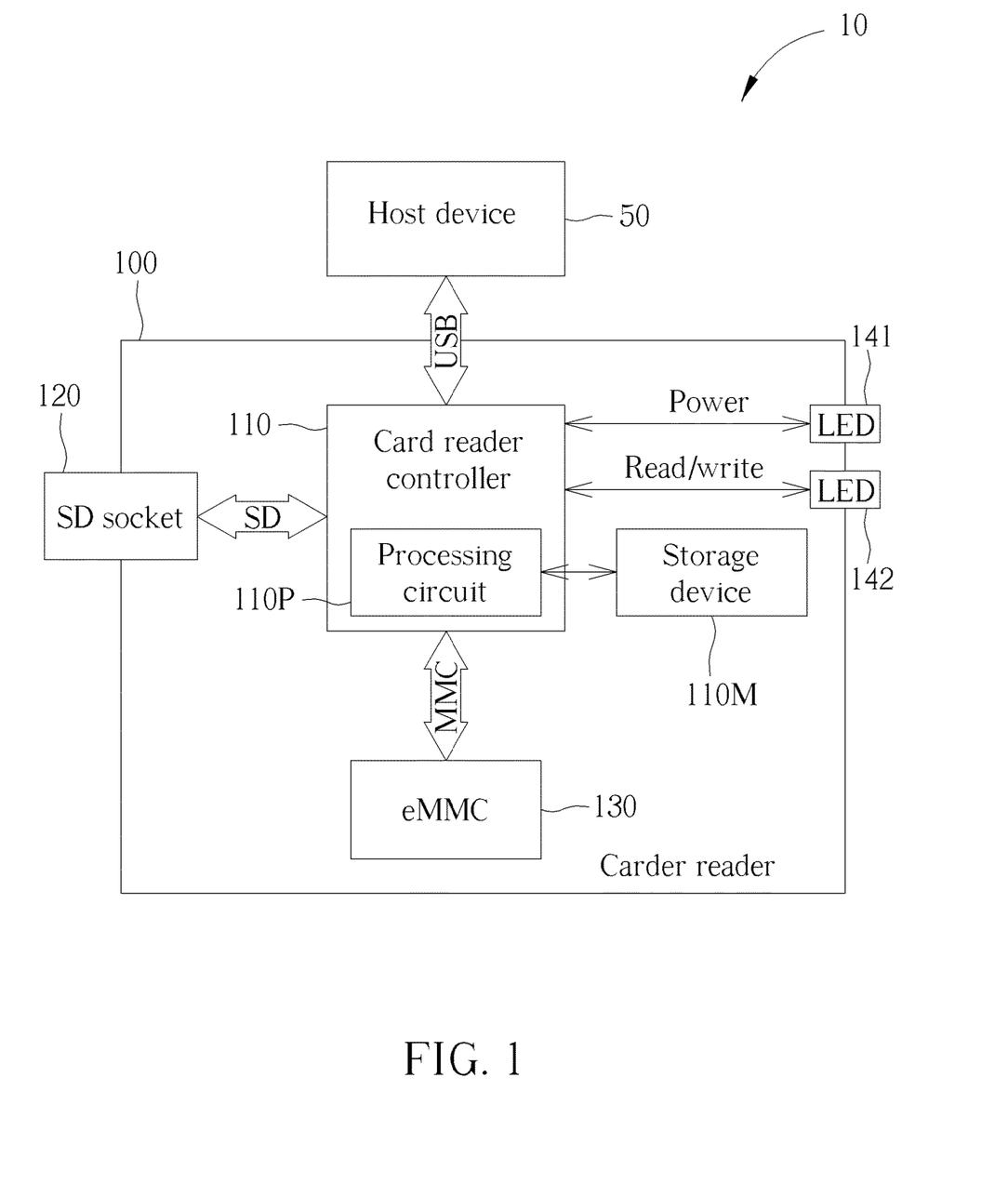
FIG. 1 is a diagram illustrating an electronic device according to an embodiment of the present invention.

FIG. 1 is a diagram illustrating an electronic device 10 according to an embodiment of the present invention, where the electronic device 10 may comprise a host device 50 and a card reader 100. Examples of the host device 50 may include, but are not limited to: a system on a chip (SoC) and a chipset, where the host device 50 may access one or more memory cards via the card reader 100. The card reader 100 may be taken as a bridge for converting a protocol of a memory card, such as a secure digital (SD) protocol utilized by SD memory cards, a peripheral component interconnect express (PCIe) protocol utilized by SD express memory card, a multimedia card (MMC) protocol utilized by MMCs and embedded MMCs (eMMCs), and a universal flash storage (UFS) protocol utilized by UFSs, into a universal serial bus (USB) protocol utilized by the host device 50.

As shown in FIG. 1, the card reader 100 may comprise a card reader controller 110, a storage device 110M, an SD memory socket (referred to as "SD socket" for brevity) 120, an embedded storage device such as an eMMC 130, and one or more signal lamps such as light-emitting diode (LED) lamps 141 and 142 (labeled "LED" in FIG. 1 for brevity). The card reader controller 110 may comprise a processing circuit 110P, where the storage device 110M is coupled to the card reader controller 110 (e.g. the processing circuit 110P therein). In this embodiment, the SD socket 120 may be exposed on an outer case of the card reader 100, to allow a user to plug any SD memory card (referred to as "SD card" for brevity) into the card reader 100. The eMMC 130 may be installed inside the carder reader 100 without being exposed, where the eMMC 130 is installed inside the card reader in this embodiment, but the present invention is not limited thereto. It should be noted that the SD socket 120 and the eMMC 130 of this embodiment are for illustrative purposes only, and are not meant to be a limitation of the present invention. In some embodiments, any memory card socket conforming to other types of standards may be an alternative design of the SD socket 120, and an embedded storage device conforming to a UFS standard or a non-volatile memory express (NVMe) standard and an SD card which is mechanically embedded inside the card reader 100 may be alternative designs of the eMMC 130.

It should be noted that the storage device 110M is implemented outside the card reader controller 110, but the present invention is not limited thereto. In some embodiments, the storage device 110M may be a portion of the card reader controller 110. For example, the storage device 110M may be built in the card reader controller 110.

In this embodiment, the electronic device 10 may be an apparatus equipped with a card reader, but the present invention is not limited thereto. In some embodiments, the card reader 100 and the host device 50 may be independent apparatuses. For example, the card reader 100 may be an external card reader, and the host device 50 may be a desktop computer, a laptop computer or any apparatus that is capable of connecting a card reader, where the card reader 100 may be connected to the host device via a connecting cable conforming to the USB protocol, but the present invention is not limited thereto.

In some embodiments, the storage device 110M may be configured to store specific identification data of a specific memory device. The card reader controller 110 may be configured to receive identification data of an external memory device from the external memory device when it is plugged into the card reader 100 (e.g. the SD socket 120), and determine whether the external memory device is the specific memory device according to the identification data and the specific identification data, to generate a determination result, where the card reader controller 110 may control whether to open permission of at least one function according to the determination result. In particular, information such as a manufacturer, a card name, a version, a serial number and/or a manufacturing date of any memory card may be recorded as identification data of this memory card. Taking an SD card as an example, this SD card may have a memory card identification register (CID) to record the identification data mentioned above. More particularly, this identification data is typically unique, which can be utilized for recognizing different memory cards. In particular, when a certain external memory device (e.g. a specific SD card) is selected to be a key for opening permission of the at least one function, identification data of this external memory device may be recorded in the storage device 110M via software when this external memory device is plugged into the card reader 100, or related information may be directly written into the storage device 110M by the manufacturer, for further recognition usage, but the present invention is not limited to the methods mentioned above. The specific SD card may be an example of the specific memory device mentioned above, and memory card identification data of the specific SD card may be an example of the specific identification data mentioned above.

In this embodiment, the card reader 100 may control a logic unit number (LUN) #0 to correspond to an SD card plugged into the SD socket 120, and control an LUN #1 to correspond to the eMMC 130. As the eMMC 130 corresponding to the LUN #1 is not exposed on the outside of the electronic device 10, an appearance of the card reader 100 is similar to a single-LUN card reader even though the card reader 100 is a multi-LUN card reader. When the card reader 100 is powered on and connected to the host device 50, the card reader 100 may prevent transmitting any data of the eMMC 130 to the host device 50 if no memory card is plugged into the SD socket 120. If a user plugs the specific SD card into the SD socket 120, the card reader controller 110 may determine that the identification data of the specific SD card matches the identification data stored in the storage device 110M. Thus, in addition to data of the specific SD card, data of the eMMC 130 is also able to be transmitted to the host device 50. In comparison, if the user plugs any memory card which is not the specific SD card into the SD socket 120, the determination result may indicate that this memory card is not the specific SD card as identification data of this memory card does not match the identification data stored in the storage device 110M, and the memory card controller 110 may thereby prevent opening permission to access data within a memory (i.e. the eMMC 130) corresponding to the LUN #1. For example, when the determination result indicates that this memory card is not the specific SD card, the card reader controller 110 may notify the host device 50 that the LUN #1 does not exist or not notify the host 50 that the LUN #1 exists, such that the host device 50 will not be able to access the eMMC 130.

Figure 2:
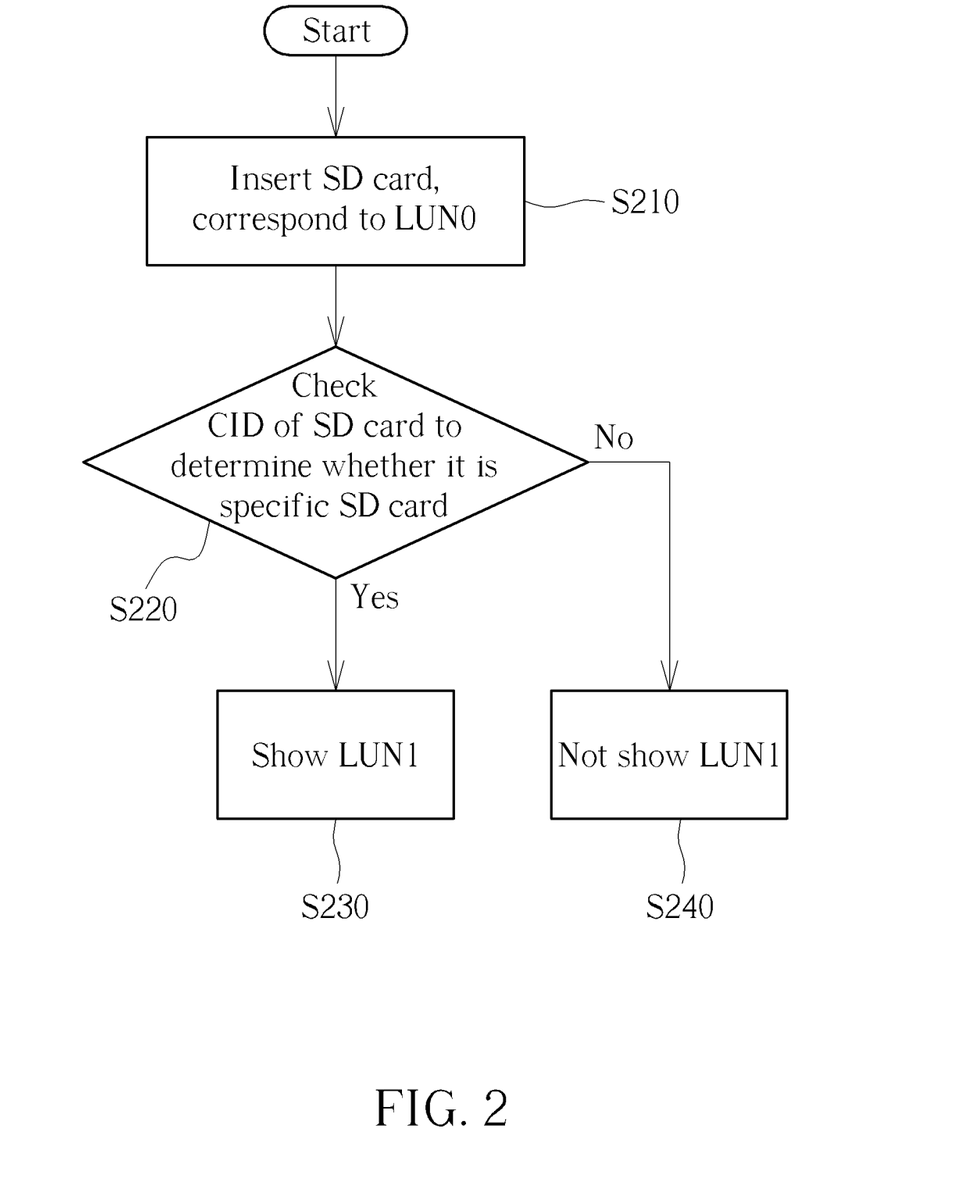
FIG. 2 is a working flow of taking a secure digital (SD) memory card as a key according to an embodiment of the present invention.

FIG. 2 is a diagram illustrating a working flow of taking an SD card as a key according to an embodiment of the present invention, where the working flow is applicable to the card reader 100 shown in FIG. 1. It should be noted that the working flow shown in FIG. 2 is for illustrative purposes only, and is not meant to be a limitation of the present invention. More particularly, one or more steps may be added, deleted or modified in the working flow shown in FIG. 2. In addition, as long as an overall result is not hindered, these steps do not have to be executed in the exact order shown in FIG. 2.

In Step S210, a user may plug or insert an SD card into the card reader 100, to make this SD card correspond to the LUN #0 (labeled "Insert SD card, correspond to LUN0" in FIG. 2 for brevity).

In Step S220, the card reader controller 110 may check memory CID data of this SD card to determine whether identification data of this SD card is recorded in the card reader 100 (e.g. recorded in the storage device 110M), where this step is labeled "Check CID of SD card to determine whether it is specific SD card" in FIG. 2 for better comprehension. If the determination result shows "Yes", the flow proceeds with Step S230; if the determination result shows "No", the flow proceeds with Step S240.

In Step S230, the card reader controller 110 may report the LUN #1 to the host device 50, to allow the host device 50 to access the memory corresponding to the LUN #1 (labeled "Show LUN1" in FIG. 2 for brevity).

In Step S240, the card reader controller 110 may prevent reporting the LUN #1 to the host device, to prevent the host device from accessing the memory corresponding to the LUN #1 (labeled "Not show LUN1" in FIG. 2 for brevity).

To further improve security of private data stored in the memory corresponding to the LUN #1 (e.g. the eMMC 130), when the determination result generated by the card reader controller 110 indicates that the external memory device is the specific memory device (e.g. when the determination result indicates that the memory card plugged into the card reader 100 is the specific SD card), the card reader controller 110 may further detect a plugging pattern of the specific memory device to generate a detection result. For example, in addition to recording the identification data of the specific SD card into the storage device 110M in advance, the user or the manufacturer may encode a specific plugging pattern (e.g. a specific plugging manner) of the specific SD card in advance, in order to generate an encoding result corresponding to the specific plugging pattern, and store the encoding result into the storage device 110M. When the detection result indicates that the plugging pattern of the specific SD card matches the specific plugging pattern, the card reader controller 110 may allow the host device 50 to access the eMMC 130. When the detection result indicates that the plugging pattern of the specific SD card does not match the specific plugging pattern, the card reader controller 110 may prevent the host device 50 from accessing the eMMC 130.

In some embodiments, the plugging pattern may comprise a number of times of the specific memory device being plugged into the card reader 100 during a specific period. For example, the encoding result recorded in the storage device 110M may correspond to plugging the specific SD card into the card reader 100 a specific number of times (e.g. three times) during a specific period (e.g. thirty seconds). The user needs to plug the specific SD card into the card reader 100 for the specific number of times during the specific period (i.e. three times within thirty seconds) in order to open permission to access the eMMC 130 to make the data within the eMMC 130 be shown.

In some embodiments, the plugging pattern may comprise multiple times of the specific memory device being plugged into the card reader 100 during multiple specific periods, respectively. The encoding result recorded in the storage device 110M may correspond to plugging the specific SD card into the card reader 100 a corresponding number of times during multiple specific periods, respectively (e.g. a first specific period lasting thirty seconds, a second specific period lasting thirty seconds and a third specific period lasting thirty seconds); for example, plugging the specific SD card into the card reader 100 twice during the first specific period, plugging the specific SD card into the card reader 100 five times during the second specific period, and plugging the specific SD card into the card reader 100 four times during the third specific period. The user needs to plug the specific SD card into the card reader 100 a corresponding number of times during the multiple specific periods, respectively, in order to open permission for accessing the eMMC 130. For example, the user needs to plug the specific SD card into the card reader 100 twice within the first specific period, plug the specific SD card into the card reader 100 five times within the second specific period, and plug the specific SD card into the card reader 100 four times within the third specific period, in order to make the data within the eMMC 130 be shown. In practice, the user may determine the timing of inserting the specific memory card with the aid of LED lamps of the card reader 100. In the embodiment of FIG. 1, the LED lamp 141 may be configured to express a power status. Under a condition of no SD card being plugged into the SD socket 130, the LED lamp 141 may remain on. In addition, the LED lamp 142 may be configured to express a data read/write status, where the LED lamp 142 may flicker to indicate that there is data being read or written via the card reader 100. In this embodiment, the LED lamp 141 may be configured to make the user know an input status at a particular moment (e.g. configured to specify the first specific period, the second specific period and the third specific period). For example, after the specific SD card is plugged into the card reader 100 for the first time, the LED lamp 141 may flicker for thirty seconds to make the user know that the first specific period is entered. The specific SD card needs to be plugged into the card reader 100 twice within the first specific period, and the user therefore needs to plug the specific SD card into the card reader 100 twice within thirty seconds. After thirty seconds have passed, the LED lamp 141 may remain turned on to make the user know that input of a next round may start. When the user plugs the specific SD card into the card reader 100 again after the LED lamp 141 remains on, the LED lamp 141 may start flickering for thirty seconds to make the user know that the second specific period is entered. The specific SD card needs to be plugged into the card reader 100 five times within the second specific period, and the user therefore needs to plug the specific SD card into the card reader another four times within thirty seconds. After thirty seconds have passed, the LED lamp 141 may remain on to make the user know that input of a next round may start. When the user plugs the specific SD card into the card reader 100 again after the LED lamp 141 remains on (i.e. stops flickering), the LED lamp 141 may again start flickering for thirty seconds to make the user know that the third specific period is entered. The specific SD card needs to be plugged into the card reader 100 for three times within the third specific period, and the user therefore needs to plug the specific SD card into the card reader another two times within thirty seconds and then leave the specific SD card in the SD socket 120. After thirty seconds have passed, the LED lamp 141 may remain on. The user has to plug the specific SD card into the card reader 100 a correct number of times during the first specific period, the second specific period and the third specific period, respectively, in order to make private data within the memory corresponding to the LUN #1 (e.g. the eMMC 130) be shown.

It should be noted that utilizing light of an LED to make the user know a current input phase is for illustrative purposes only, and is not meant to be a limitation of the present invention. In some embodiments, the LED light may be breathing light, color-changing, etc. in order to notify the user.

In some embodiments, the plugging pattern may comprise multiple write-protection-switch states of the SD memory card during multiple specific periods, respectively. In particular, an SD card may be equipped with a write-protection switch, to allow the card reader 100 to determine whether this SD card is in a write-protection state, and the write-protection switch of this SD card may be configured to increase complexity of encoding the specific plugging pattern. For example, during the first specific period, the write-protection switch of the specific SD card needs to be turned on; during the second specific period, the write-protection switch of the specific SD card needs to be turned off; and during the third specific period, the write-protection switch of the specific SD card needs to be turned on. The user needs to make the write-protection switch of the specific SD card be configured in correct states during the first specific period, the second specific period and the third specific period, respectively, in order to make the private data within the memory corresponding to the LUN #1 (e.g. the eMMC 130) be shown. It should be noted that utilizing the write-protection switch to provide a variation of the plugging pattern takes an SD card as an example, where if the specific memory device is implemented with other types of memory cards, any mechanical switch on these memory cards can be applied to the encoding of the plugging pattern of the present invention in a similar way.

In some embodiments, the plugging pattern may comprise a time length of maintaining the specific memory device in a state of being plugged into the carder reader 100. For example, the time length of maintaining the specific memory device in the state of being plugged into the carder reader 100 needs to match a time length corresponding to the encoding result recorded in the storage device 110M, in order to make the private data within the memory corresponding to the LUN #1 (e.g. the eMMC 130) be shown.

In some embodiments, any combination of methods for varying the plugging pattern (e.g. the number of times of plugging the specific memory device into the card reader 100, the detection of multiple periods, the position of the mechanical switch and the time length of plugging the specific memory device into the card reader 100) may be utilized in order to increase the complexity of the plugging pattern as much as possible, to thereby improve the security. For brevity, related alternative implementations are omitted here.

In some embodiments, when the memory corresponding to the LUN #0 (e.g. the specific SD card plugged into the SD socket 120) is removed or unplugged, permission for accessing the memory corresponding to the LUN #1 (e.g. the eMMC 130) may be closed immediately. In some embodiments, when the memory corresponding to the LUN #0 (e.g. the specific SD card plugged into the SD socket 120) is removed or unplugged, permission for accessing the memory corresponding to the LUN #1 (e.g. the eMMC 130) may be closed after a delay. It should be noted that, as long as the card reader 100 is powered off, it is required to utilize the specific SD card and/or the plugging pattern mentioned above for opening permission to access the eMMC 130 again when the card reader is powered on a next time.

Figure 3:
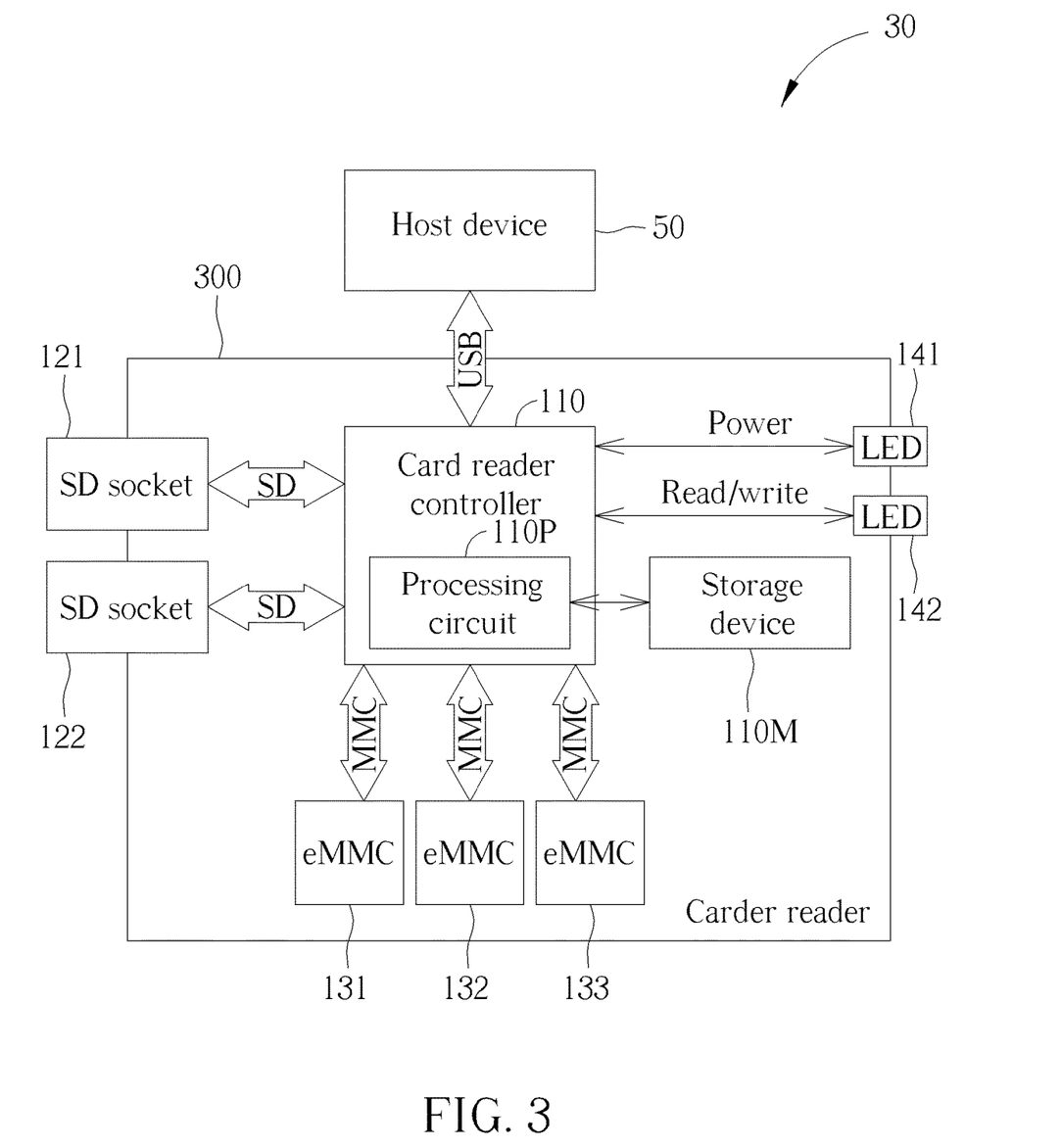
FIG. 3 is a diagram illustrating an electronic device according to an embodiment of the present invention.

FIG. 3 is a diagram illustrating an electronic device 30 according to an embodiment of the present invention, where the electronic device 30 may comprise the host device 50 and a card reader 300. It should be noted that the card reader 300 may be an example of the card reader 100, and related details of the card reader controller 110 (and the processing circuit 110P therein), the storage device 110M, the LED lamps 141 and 142 are not repeated here for brevity. As shown in FIG. 3, the card reader 300 may support five LUNs, where an SD socket 121 (e.g. any memory card plugged into the SD socket 121) may correspond to the LUN #0, an SD socket 122 (e.g. any memory card plugged into the SD socket 122) may correspond to the LUN #1, and eMMCs 131, 132 and 133 may correspond to LUNs #2, #3 and #4, respectively. Any (e.g. each) of the SD sockets 121 and 122 may be an example of the SD socket 120, and any (e.g. each) of the eMMCs 131, 132 and 133 may be an example of the eMMC 130.

It should be noted that not all of the LUNs #2, #3 and #4 have to be protected by the aforementioned mechanism. For example, private data within the memories respectively corresponding to the LUNs #3 and #4 (e.g. the eMMCs 132 and 133) may be protected by the security mechanism mentioned above, and data within the memory corresponding to the LUN #2 may be accessible by default. Thus, after the card reader 300 is powered on or connected to the host device 50, even if no SD card is plugged into any of the SD sockets 121 and 122, the data within the eMMC 131 is still able to be shown. By comparison, the user needs to open permission for accessing the eMMCs 132 and 133 with the aid of the specific SD card. In some embodiments, permission for accessing the eMMCs 132 and 133 may be opened via a same specific SD card. For example, no matter which specific SD card is plugged into which SD socket of the SD sockets 121 and 122, permission for accessing both eMMCs 132 and 133 may be opened. In some embodiments, permission for accessing the eMMC 132 may be opened by plugging a specific SD card into the SD socket 121, and permission for accessing the eMMC 133 may be opened by plugging this specific SD card into the SD socket 122. In some embodiments, permission for accessing the eMMC 132 may be opened by plugging a first specific SD card into any of the SD sockets 121 and 122, and permission for accessing the eMMC 133 may be opened by plugging a second specific SD card into any of the SD sockets 121 and 122. In some embodiments, permission for accessing the eMMC 132 may be opened by plugging a first specific SD card into the SD socket 121, and permission for accessing the eMMC 133 may be opened by plugging a second specific SD card into the SD socket 122. It should be noted that, as SD cards are typically hard to be replicated, the storage device 110M may record multiple first specific SD cards and multiple second specific SD cards, where any of the first specific SD cards may be plugged into the SD socket 121 to open permission for accessing the eMMC 132, and any of the second specific SD cards may be plugged into the SD socket 122 to open permission for accessing the eMMC 133.

The control of access permission to multiple LUNs can achieve the purpose of security protection by hiding private data, and the user can store work data and private data in different positions (e.g. memories corresponding to different LUNs), to thereby prevent operation mistakes with the aid of the aforementioned access permission control.

In some embodiments, the card reader 100 (e.g. the card reader 300) may utilize a security protection mechanism provided by the eMMC 130 (e.g. any of the eMMCs 131, 132 and 133) to encrypt data therein, or utilize an encryption/decryption mechanism built in the card reader 100 (e.g. the card reader 300) to encrypt the data. When the specific SD card is plugged into the card reader 100, the card reader 100 may decrypt the data within the memory (e.g. the eMMC 130) corresponding to a specific LUN. Thus, even if the eMMC 130 installed inside the card reader 100 is forcibly removed, the data therein will still be unable to be successfully decrypted for read operations.

Figure 4:
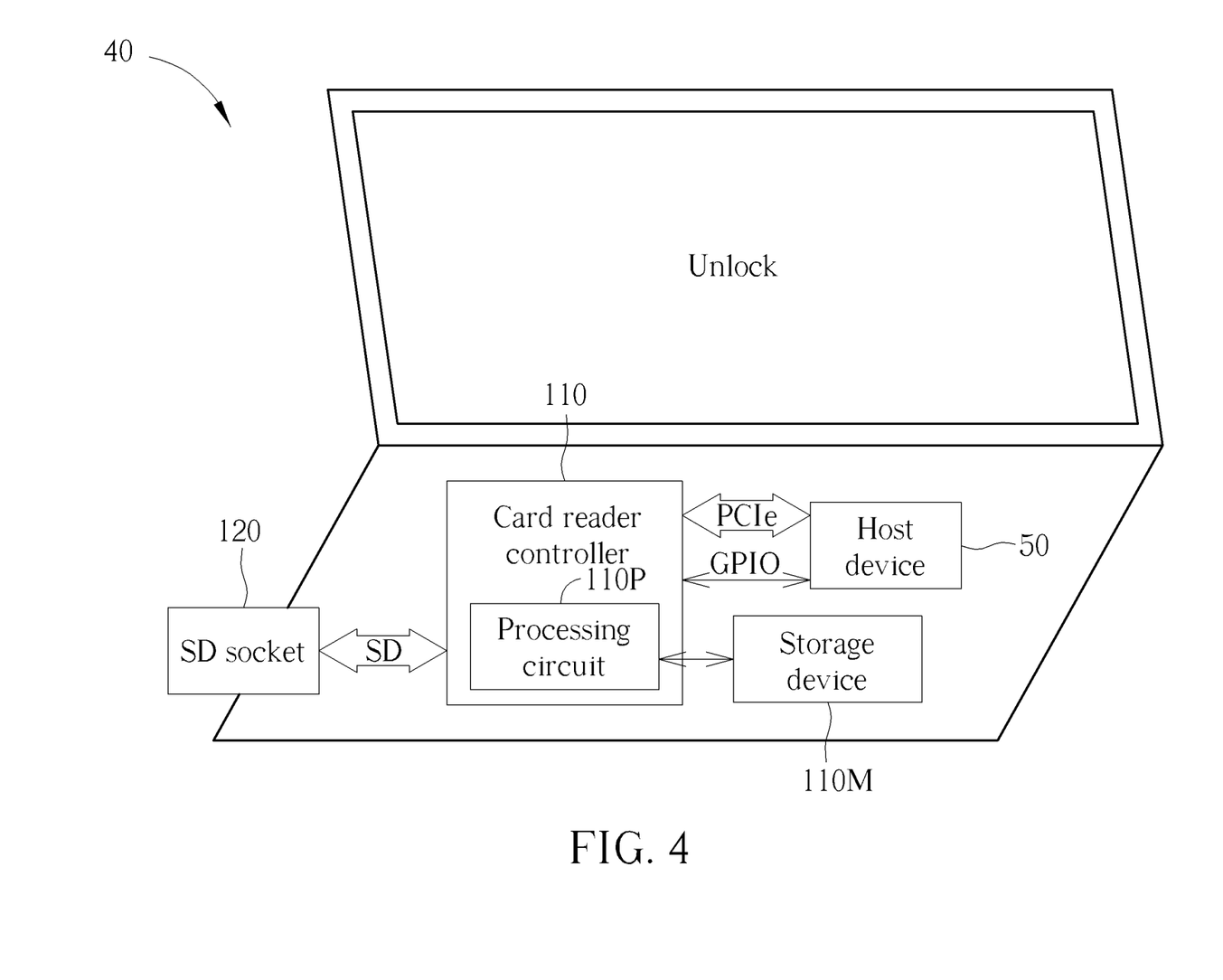
FIG. 4 is a diagram illustrating a laptop computer according to an embodiment of the present invention.

In addition, the card reader 100 or the card reader 300 mentioned above is applicable to an unlock operation of any device such as a desktop computer and a laptop computer which has a built-in card reader. FIG. 4 is a diagram illustrating a laptop computer 40 according to an embodiment of the present invention, where the card reader 100 (more particularly, the card reader controller 110, the storage device 110M and the SD socket 120) may be built in the laptop computer 40. In this embodiment, when the user intends to unlock and log in the laptop computer 40, the user needs to plug the specific SD card into the SD socket 120. After the card reader controller 110 detects that the specific SD card is plugged into the SD socket 120, the card reader controller 110 may be coupled to communicate with the host device 50 via an interface conforming to the PCIe protocol (labeled "PCIe" in FIG. 4 for brevity) or a general-purpose input/output (GPIO) interface (labeled "GPIO" in FIG. 4 for brevity). The host device 50 may control whether to unlock the laptop computer for logging in the user in response to a detection result transmitted from the card reader controller 110.

Figure 5:
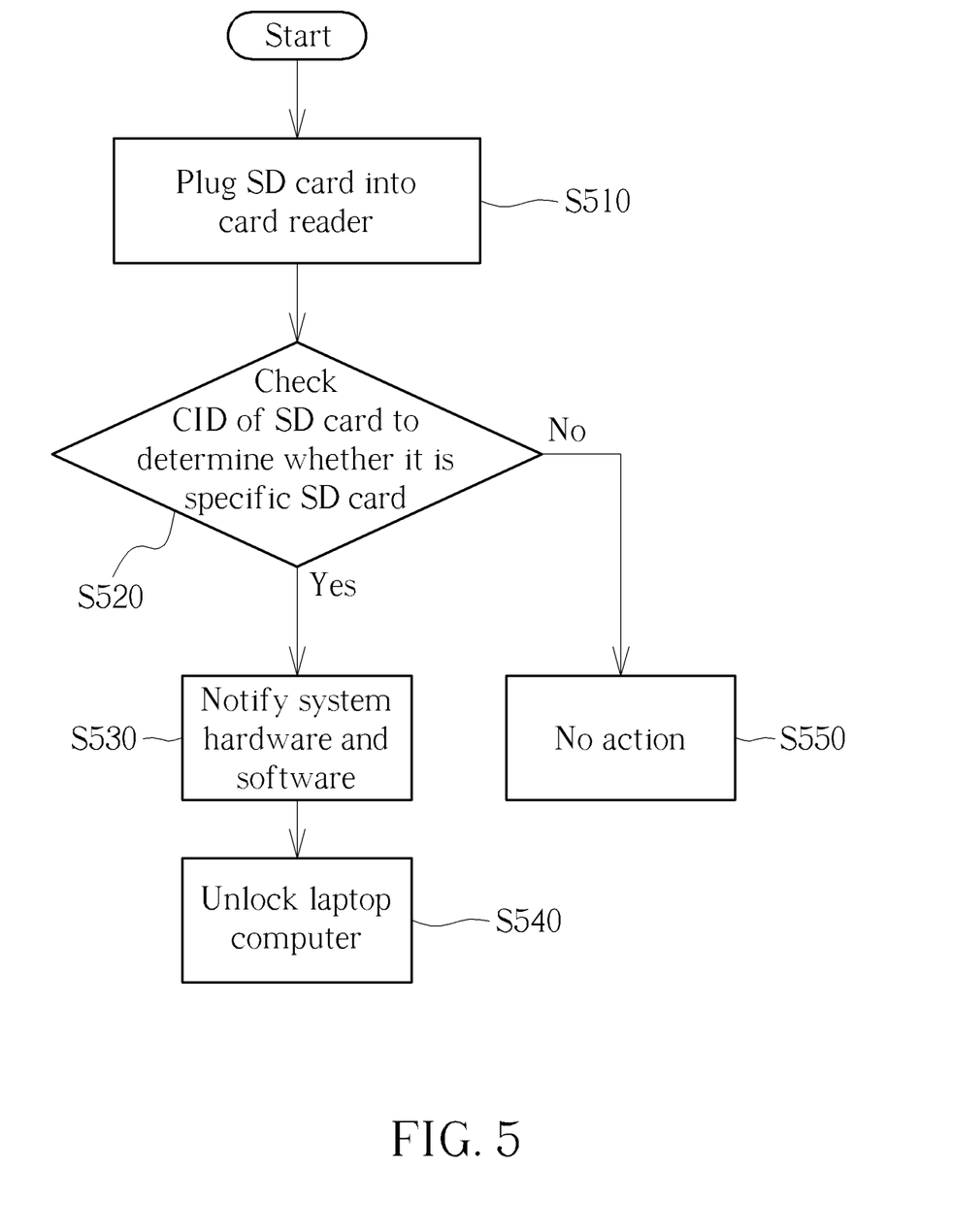
FIG. 5 is a diagram illustrating a working flow of utilizing an SD memory card to unlock the laptop computer shown in FIG. 4 according to an embodiment of the present invention.

FIG. 5 is a diagram illustrating a working flow of utilizing the specific SD card to unlock the laptop computer 40 shown in FIG. 4 according to an embodiment of the present invention. It should be noted that the working flow shown in FIG. 5 is for illustrative purposes only, and is not meant to be a limitation of the present invention. More particularly, one or more steps may be added, deleted or modified in the working flow shown in FIG. 5. In addition, as long as an overall result is not hindered, these steps do not have to be executed in the exact order shown in FIG. 5.

In Step S510, the user may plug an SD card into a card reader (e.g. the SD socket 120 shown in FIG. 4).

In Step S520, the card reader controller 110 may check memory card identification data of this SD card in order to determine whether identification data of this SD card is recorded in the storage device 110M (labeled "Check CID of SD card to determine whether it is specific SD card" in FIG. 5 for better comprehension). If the determination result shows "Yes", the flow proceeds with Step S530; and if the determination result shows "No", the flow proceeds with Step S550.

In Step S530, the card reader controller 110 may notify system hardware and software of the host device 50 that the SD card is indeed the specific SD card (labeled "Notify system hardware and software" in FIG. 5 for brevity).

In Step S540, the host device 50 may unlock the laptop computer 40 to allow the user to log in.

In Step S550, the host device 50 may keep the laptop computer 40 at a locked status (labeled "No action" in FIG. 5 for brevity).

Figure 6:
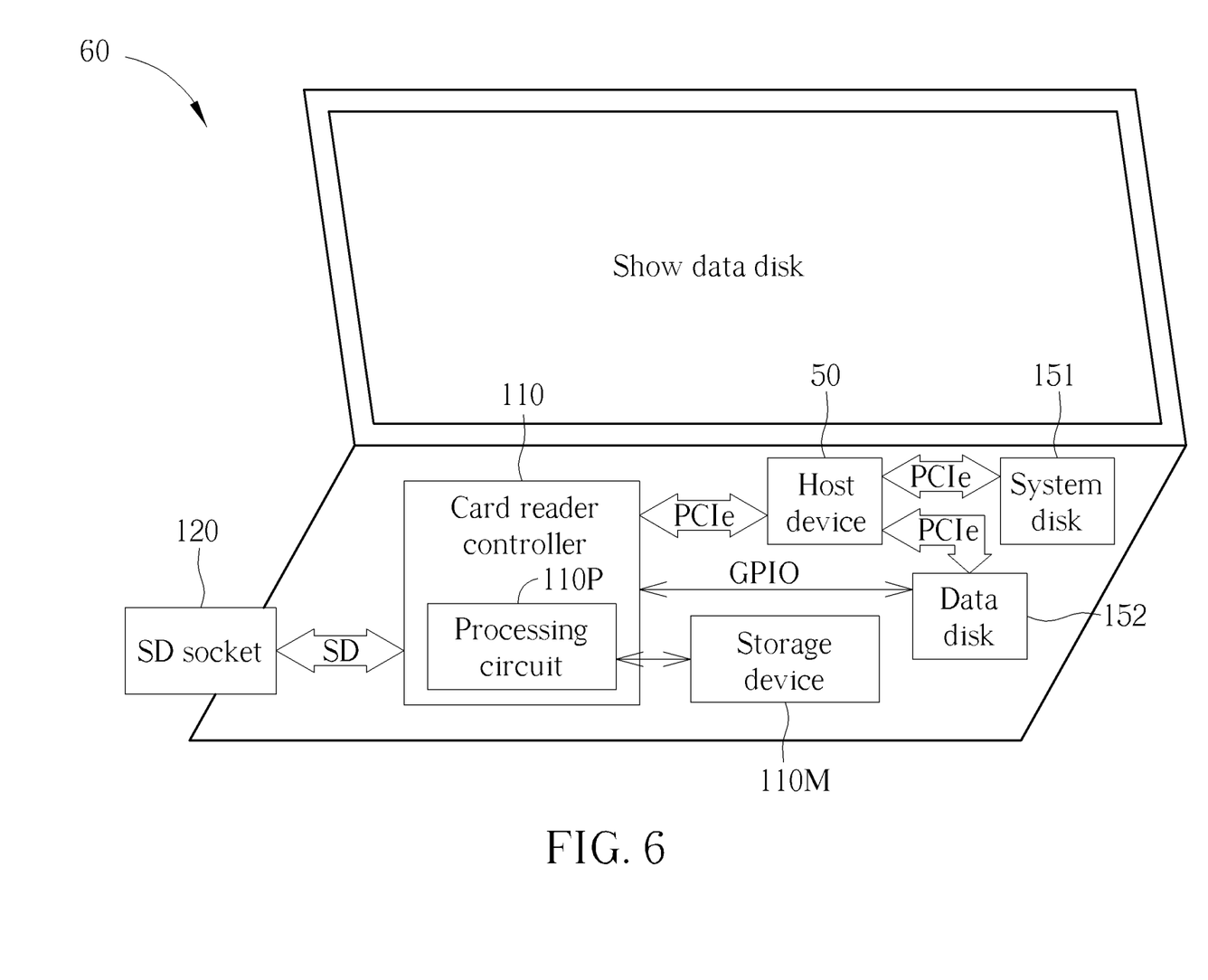
FIG. 6 is a diagram illustrating a laptop computer according to another embodiment of the present invention.

FIG. 6 is a diagram illustrating a laptop computer 60 according to an embodiment of the present invention, where the card reader 100 (more particularly, the card reader controller 110, the storage device 110M and the SD socket 120) may be built in the laptop computer 60. In this embodiment, the card reader controller 110 may control access permissions of one or more storage devices (e.g. solid-state drives) within the laptop computer 60 via the interface conforming to the PCIe protocol or the GPIO interface. For example, the laptop computer 60 may comprise a system hard drive 151 (labeled "System disk" in FIG. 6 for brevity) and a data hard drive 152 (labeled "Data disk" in FIG. 6 for brevity), where the host device 50 may communicate with the system hard drive 151 and the data hard drive 152 via interfaces conforming to the PCIe protocol (labeled "PCIe" in FIG. 6 for brevity), and the card reader controller 110 may communicate with the data hard drive 152 via a GPIO interface (labeled "GPIO" in FIG. 6 for brevity). In particular, the laptop computer 60 may always show the system hard drive 151, and the data hard drive 152 may be protected by the security mechanism of the present invention. Thus, the data hard drive 152 is not shown on an operating system of the laptop computer 60 under a default condition (e.g. power of the data hard drive 152 may be disabled at the beginning by default). When the user plugs the specific SD card into the SD socket 120, the card reader controller 110 may turn on the power or an enablement switch of the data hard drive 152 via the GPIO interface, and make data within the data hard drive 152 be shown on the operating system of the laptop computer 60 via a hot plug mechanism of an interface conforming to the PCIe protocol.

Figure 7:
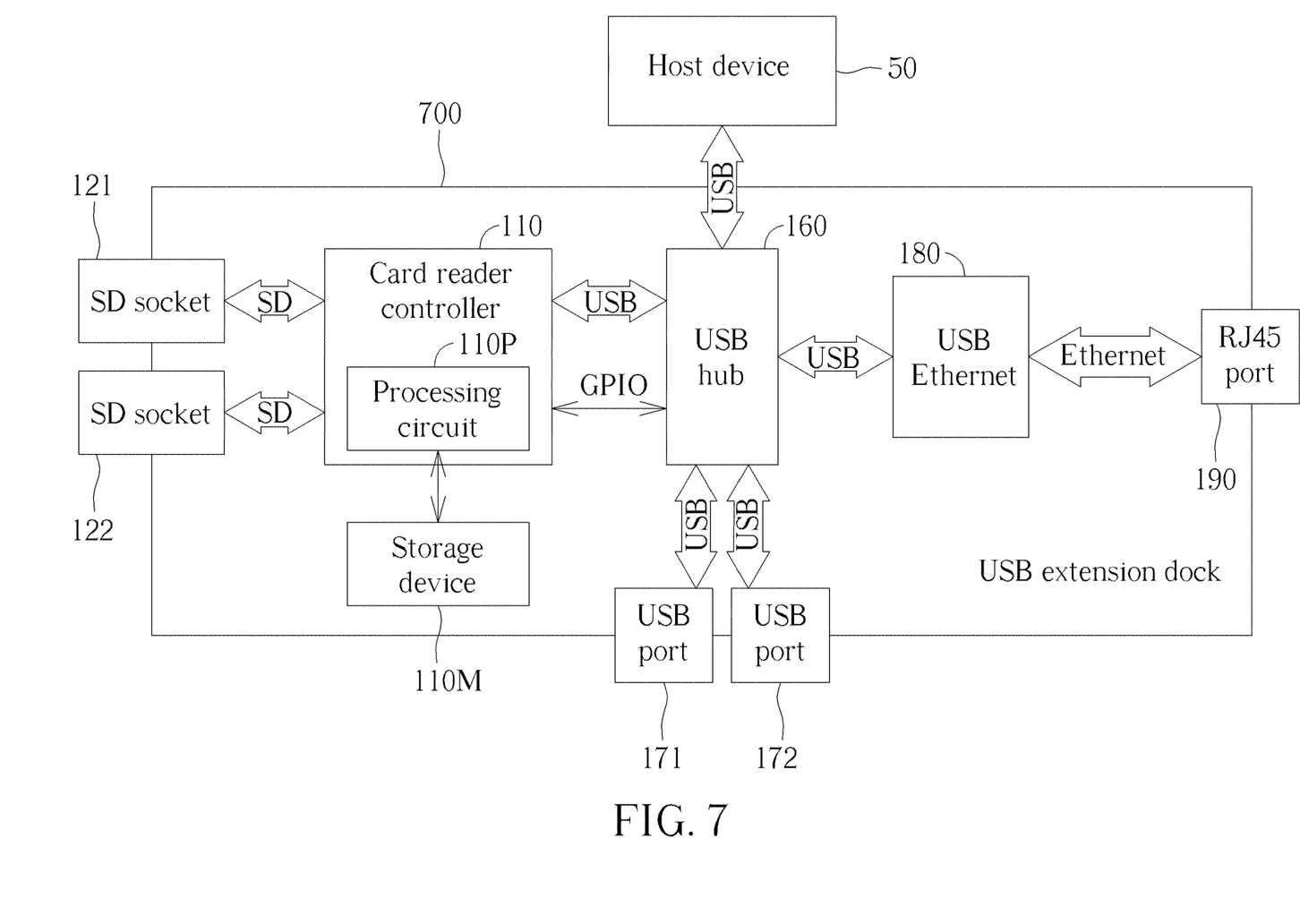
FIG. 7 is a diagram illustrating an extension dock device according to an embodiment of the present invention.

FIG. 7 is a diagram illustrating an extension dock device (e.g. a docking station) 700 conforming to the USB protocol (referred to as "USB extension dock" for brevity) according to an embodiment of the present invention. In this embodiment, the USB extension dock 700 may comprise a card reader (more particularly, the SD sockets 121 and 122, the card reader controller 110 and the storage device 110M), and may further comprise a hub 160 conforming to the USB protocol (referred to as "USB hub" for brevity), connecting ports 171 and 172 conforming to the USB protocol (referred to as "USB ports" for brevity), an Ethernet device 180 conforming to the USB protocol (referred to as "USB Ethernet" for brevity) and an RJ45 port 190. In this embodiment, an extension function (e.g. operations executed by one or more extension interfaces for being coupled to the host device 50, the USB ports 171 and 172 and the USB Ethernet 180) of the USB hub 160 may be disabled by default, where the user may plug the specific SD card into the SD socket 121 or 122, and when the card reader controller 110 detects that the specific SD card is plugged into any of the SD sockets 121 and 122, the card reader controller 110 may enable the extension function of the USB hub 160 via a GPIO interface (labeled "GPIO" in FIG. 7 for brevity). Thus, the present invention can prevent users without permissions (e.g. users who do not plug the specific SD card into the SD sockets 121 or 122) from using the extension function of the USB extension dock 700.

It should be noted that the interface confirming to the PCIe protocol, the interface conforming to the USB protocol, and the GPIO interface mentioned in the above embodiments are for illustrative purposes only, and are not meant to be a limitation of the present invention. As long as an overall implementation of the present invention is not hindered, implementations of these interfaces may vary.

Figure 8:
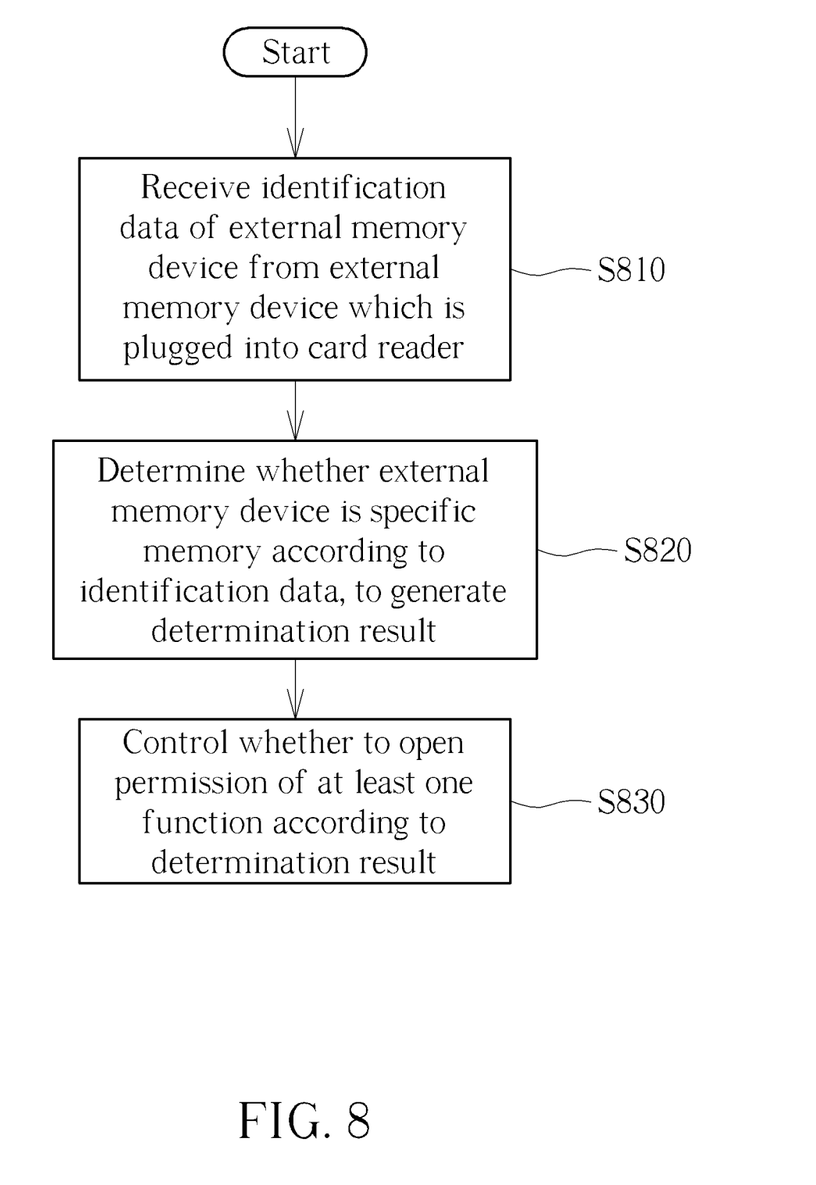
FIG. 8 is a diagram illustrating a working flow of a method for permission management according to an embodiment of the present invention.

FIG. 8 is a diagram illustrating a working flow of a method for permission management according to an embodiment of the present invention, where the method is applicable to a controller of a card reader such as the card reader controller 110 in the above embodiments. It should be noted that the working flow shown in FIG. 8 is for illustrative purposes only, and is not meant to be a limitation of the present invention. More particularly, one or more steps may be added, deleted or modified in the working flow shown in FIG. 8. In addition, as long as an overall result is not hindered, these steps do not have to be executed in the exact order shown in FIG. 8.

In Step S810, the card reader controller 110 may receive identification data of an external memory device from the external memory device which is plugged into the card reader.

In Step S820, the card reader controller 110 may determine whether the external memory device is a specific memory device (e.g. the specific SD card) according to the identification data, to generate a determination result.

In Step S830, the card reader controller 110 may control whether to open permission of at least one function according to the determination result.

To summarize, the card reader and the associated method provided by the embodiments of the present invention can take a specific external memory device as a key for unlocking one or more functions of an electronic device. Furthermore, the embodiments of the present invention can take a plugging pattern of the specific external memory device (e.g. the number of times of card insertion or the manner of plugging the specific external memory device into the card reader) as a password, in order to establish a data protection mechanism without requiring any additional keypad or fingerprint detection module. As existing functions and appearance of a typical card reader can be maintained, the present invention can provide effective data protection mechanism without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A card reader, comprising:
a storage device, configured to store specific identification data of a specific memory device, wherein the specific memory device is a secure digital (SD) memory card; and
a controller, coupled to the storage device, configured to receive identification data of an external memory device which is plugged into the card reader, and determine whether the external memory device is the specific memory device according to the identification data and the specific identification data, to generate a determination result;
wherein:
when the determination result indicates that the external memory device is not the specific memory device, the controller prevents opening permission of at least one function;
when the determination result indicates that the external memory device is the specific memory device, the controller detects a plugging pattern of the specific memory device to generate a detection result, and the plugging pattern comprises multiple write-protection-switch states of the SD memory card during multiple specific periods, respectively;
when the multiple write-protection-switch states do not match predetermined states, respectively, the controller prevents opening permission of the at least one function; and
when the multiple write-protection-switch states match the predetermined states, respectively, the controller opens permission of the at least one function.

2. The card reader of claim 1, wherein the plugging pattern comprises a number of times of the specific memory device being plugged into the card reader during a specific period.

3. The card reader of claim 1, wherein the plugging pattern comprises multiple numbers of times of the specific memory device being plugged into the card reader during multiple specific periods, respectively.

4. The card reader of claim 1, wherein the plugging pattern comprises a time length of maintaining the specific memory device in a state of being plugged into the card reader.

5. The card reader of claim 1, wherein the at least one function comprises access of data within a memory corresponding to a specific logic unit number (LUN).

6. The card reader of claim 1, wherein the at least one function comprises decoding data within a memory corresponding to a specific logic unit number (LUN).

7. The card reader of claim 1, wherein an electronic device comprises the card reader, and the at least one function comprises unlocking the electronic device.

8. The card reader of claim 1, wherein an extension dock device comprises the card reader and one or more extension interfaces, and the at least one function comprises enabling the one or more extension interfaces.

9. A controller of a card reader, comprising:
a processing circuit, coupled to a storage device, configured to control operations of the controller according to data stored in the storage device, wherein the storage device is configured to store specific identification data of a specific memory device, wherein the specific memory device is a secure digital (SD) memory card;
wherein:
the controller receives identification data of an external memory device plugged into the card reader, and determines whether the external memory device is the specific memory device according to the identification data and the specific identification data, to generate a determination result;
when the determination result indicates that the external memory device is not the specific memory device, the controller prevents opening permission of at least one function;
when the determination result indicates that the external memory device is the specific memory device, the controller detects a plugging pattern of the specific memory device to generate a detection result, and the plugging pattern comprises multiple write-protection-switch states of the SD memory card during multiple specific periods, respectively;
when the multiple write-protection-switch states do not match predetermined states, respectively, the controller prevents opening permission of the at least one function; and
when the multiple write-protection-switch states match the predetermined states, respectively, the controller opens permission of the at least one function.

10. A method for permission management, the method being applicable to a controller of a card reader, the method comprising:
utilizing the controller to receive identification data of an external memory device plugged into the card reader;
utilizing the controller to determine whether the external memory device is a specific memory device according to the identification data, to generate a determination result, wherein the specific memory device is a secure digital (SD) memory card; and
utilizing the controller to control whether to open permission of at least one function according to the determination result;
wherein:
in response to determining that the determination result indicates that the external memory device is the specific memory device, detecting, with the controller, a plugging pattern of the specific memory device to generate a detection result, wherein the plugging pattern comprises multiple write-protection-switch states of the SD memory card during multiple specific periods, respectively, and wherein:
in response to the multiple write-protection-switch states not matching predetermined states, respectively, preventing, with the controller, opening permission of the at least one function; or in response to the multiple write-protection-switch states matching the predetermined states, respectively, opening, with the controller, permission of the at least one function.

11. The method of claim 10, wherein the plugging pattern comprises a number of times of the specific memory device being plugged into the card reader during a specific period.

12. The method of claim 10, wherein the plugging pattern comprises multiple numbers of times of the specific memory device being plugged into the card reader during multiple specific periods, respectively.

13. The method of claim 10, wherein the plugging pattern comprises a time length of maintaining the specific memory device in a state of being plugged into the card reader.

14. The method of claim 10, wherein the at least one function comprises access of data within a memory corresponding to a specific logic unit number (LUN).

* * * * *